(12) United States Patent
Pyre et al.

(10) Patent No.: US 11,092,110 B2
(45) Date of Patent: Aug. 17, 2021

(54) ROCKET ENGINE INCLUDING A LASHING DEVICE

(71) Applicant: ARIANEGROUP SAS, Paris (FR)

(72) Inventors: Alain Pyre, Saint-Just (FR); Gérard Roz, Pressagny L'Orgueilleux (FR)

(73) Assignee: Arianegroup SAS, Paris (FR)

( * ) Notice: Subject to any disclaimer, the term of this patent is extended or adjusted under 35 U.S.C. 154(b) by 362 days.

(21) Appl. No.: 16/328,752

(22) PCT Filed: Aug. 23, 2017

(86) PCT No.: PCT/FR2017/052263
§ 371 (c)(1),
(2) Date: Feb. 27, 2019

(87) PCT Pub. No.: WO2018/042106
PCT Pub. Date: Mar. 8, 2018

(65) Prior Publication Data
US 2019/0195171 A1    Jun. 27, 2019

(30) Foreign Application Priority Data

Sep. 1, 2016  (FR) ...................................... 1601289

(51) Int. Cl.
*F02K 9/38* (2006.01)
*B64G 5/00* (2006.01)
(Continued)

(52) U.S. Cl.
CPC .................. *F02K 9/38* (2013.01); *B64G 5/00* (2013.01); *F02K 9/95* (2013.01); *F02K 9/96* (2013.01); *F02K 9/97* (2013.01)

(58) Field of Classification Search
CPC ..... F02K 9/38; F02K 9/95; F02K 9/96; F02K 9/97; B64G 5/00
See application file for complete search history.

(56) References Cited

U.S. PATENT DOCUMENTS 4,779,799 A * 10/1988 Jencek .................... F02K 9/976
239/265.19
8,281,599 B2 * 10/2012 Even ....................... F02K 9/805
60/770

(Continued)

FOREIGN PATENT DOCUMENTS

| FR | 2 956 739 | 8/2011 |
| FR | 3 022 629 | 12/2015 |
| RU | 2 225 527 | 3/2004 |

OTHER PUBLICATIONS

International Search Report and Written Opinion issued in International Application No. PCT/FR2017/052263, dated Nov. 23, 2017 (10 pages).

*Primary Examiner* — Lorne E Meade
(74) *Attorney, Agent, or Firm* — Bookoff McAndrews, PLLC

(57) ABSTRACT

A rocket engine benefiting from better behavior during its starting stage, the rocket engine (1) including a diverging section (13) and a lashing system (40) configured to hold the diverging section (13) while starting the rocket engine (1), the lashing system (40) comprising: a plurality of radial cables (42) connected at respective first ends to a plurality of points of the diverging section (13), and a peripheral cable (41) connected to the second ends of the radial cables (42) and configured to co-operate with attachment points (43) of a launch platform (3).

13 Claims, 3 Drawing Sheets

(51) Int. Cl.
*F02K 9/96* (2006.01)
*F02K 9/97* (2006.01)
*F02K 9/95* (2006.01)

(56) References Cited

U.S. PATENT DOCUMENTS

| | | | |
|---|---|---|---|
| 9,977,848 B1* | 5/2018 | Wang | G06F 30/23 |
| 2013/0068005 A1* | 3/2013 | David | G01M 15/02 |
| | | | 73/116.03 |

* cited by examiner

ROCKET ENGINE INCLUDING A LASHING DEVICE

CROSS-REFERENCE TO RELATED APPLICATIONS

This application is the U.S. national phase entry under 35 U.S.C. § 371 of International Application No. PCT/FR2017/052263, filed on Aug. 23, 2017, which claims priority to French Patent Application No. 1601289, filed on Sep. 1, 2016.

FIELD OF THE INVENTION

The present disclosure relates to a rocket engine benefiting from better behavior during its starting stage.

Such a rocket engine may in particular be fitted to the first or only stage of a commercial launcher, of a missile, or of any other type of rocket or vehicle for civilian or military use.

STATE OF THE PRIOR ART

The main engines of the first stages of launchers are ignited while the launcher is still on the ground and are therefore subjected to ambient atmospheric pressure. Unfortunately, during transient starting conditions, the relatively long diverging section of such an engine is at pressure that is lower than ambient atmospheric pressure: under such circumstances, the diverging section is subjected to inwardly-directed stresses that are nevertheless compensated under normal circumstances because of the axisymmetric nature of the diverging section.

However, it frequently happens, in a manner that is difficult to predict and that is not steady, that jet separations occur in certain zones of the diverging section such that atmospheric pressure penetrates locally into such separation zones. Since pressure forces are then no longer symmetrical, such jet separations lead to large lateral loads that can deform the diverging section, possibly even in plastic manner, i.e. in irreversible manner.

In addition, such lateral loads can lead to lateral movements of the diverging section and can thus exert undesired stresses on other components of the rocket engine, in particular its combustion chamber, its universal joint, its actuators, or indeed its fastenings, thus running the risk of damaging them.

Unfortunately, at present, apart from the option of reinforcing the various components that are subjected to these lateral loads, and thus making them heavier, the only known solutions seek to fit the launch platform with holder devices that are bulky, complex, and expensive, and that are configured to hold the diverging section during starting prior to being retracted at the moment of liftoff, properly speaking.

There thus exists a real need for a rocket engine that benefits from better behavior during its starting stage and that is free, at least in part, from the drawbacks inherent to the above-mentioned known methods.

SUMMARY OF THE INVENTION

The present disclosure provides a rocket engine including a diverging section and a lashing system configured to hold the diverging section while starting the rocket engine, the lashing system comprising a plurality of radial cables connected at respective first ends to a plurality of points of the diverging section, and a peripheral cable connected to the second ends of the radial cables and configured to co-operate with attachment points of a launch platform.

In the present disclosure, the terms "axial", "radial", "tangential", "inner", "outer", and terms derived from them are defined relative to the main axis of the rocket engine; the term "axial plane" means the plane containing the main axis of the rocket engine and the term "radial plane" means a plane perpendicular to the main axis; finally, the terms "upstream" and "downstream" are defined relative to the flow of fluid through the rocket engine.

By means of such a lashing device, it is possible to hold the diverging section effectively while the engine is starting and thereby reduce any deformation and/or lateral displacement of the diverging section. Specifically, when a jet separation occurs in a zone of the diverging section, and thus when a lateral load appears tending to deform the opposite wall of the diverging section and/or to shift the rocket engine, that wall is held by the radial cables, which are themselves held by the peripheral cable co-operating with the attachment points of the launch platform.

Under such circumstances, any deformation of the diverging section is minimized and the risk of irreversible plastic deformation is reduced or even completely eliminated; the same applies to the combustion chamber. In addition, since lateral movements are reduced, the stresses exerted on the other components of the rocket engine such as its universal joint, its actuators, or its attachment points are reduced. The various components of the rocket engine can then be lighter in weight, thereby reducing the total weight of the rocket engine.

At the time of actual liftoff, when the rocket engine has reached steady conditions and thus when the risk of the jet separating in theory no longer exists, it is possible to release the lashing device or indeed to detach it from the diverging section so as to allow the rocket engine to move upwards and the launcher to lift off. Preferably, co-operation between the lashing device and the launch platform is interrupted: the lashing device then moves up with the rocket engine and is sucked in and destroyed by the jet of the rocket engine. Thus, the lashing device does not affect the performance of the rocket engine in flight and does not make it heavier.

In certain embodiments, the radial cables are connected to the bottom portion of the diverging section, preferably in its bottom third.

In certain embodiments, the radial cables are connected to the bottom end of the diverging section.

In certain embodiments, the diverging section has a cooling circuit fitted with outlet nozzles at the bottom end of the diverging section.

In certain embodiments, the radial cables are connected to the outlet nozzles of the cooling circuit.

In certain embodiments, the points where the radial cables are connected to the diverging section are situated in a common horizontal plane. This serves to ensure that the retaining forces of all of the radial cables act in a common plane, thereby making it easier to balance the forces exerted on the diverging section.

In certain embodiments, the points where the radial cables are connected to the diverging section are situated in such a manner that their center of gravity lies on the main axis of the diverging section.

In certain embodiments, the points where the radial cables are connected to the diverging section are configured so as to present an invariance in rotation about the main axis of the diverging section.

In certain embodiments, the points where the radial cables are connected to the diverging section are situated in axisymmetric manner relative to the main axis of the diverging section.

In certain embodiments, the points where the radial cables are connected to the diverging section are spaced apart in regular manner around the axis of the diverging section. These various measures serve to facilitate balancing the forces exerted on the diverging section. By means of such a configuration presenting a high degree of symmetry and regularity, it is ensured that forces are well distributed and well balanced among the various radial cables, thereby enabling the diverging section to be held correctly regardless of the zone in which a jet separation might occur.

In certain embodiments, the lashing system has at least three radial cables, preferably at least six radial cables.

In certain embodiments, all of the radial cables are of substantially the same length.

In certain embodiments, this length is greater than 3 m.

In certain embodiments, at least one radial cable, and preferably all of the radial cables, is/are slidable relative to the peripheral cable. Firstly, this is an easy way of connecting the radial cables to the peripheral cable, since, for example, the peripheral cable can pass through a loop formed at the end of said radial cable. In addition, this makes it possible, where appropriate, for the radial cables to move along the peripheral cable, particularly in the event of a large deformation of the diverging section, so as to enable them to become directed relative to the diverging section as well as possible for exerting an effective retaining force, generally being directed perpendicularly to its wall.

In certain embodiments, the peripheral cable includes a tensioner. This tensioner, which may in particular be a turnbuckle or a spring, serves to control the tension in the peripheral cable in order to adjust the performance of the lashing device.

In certain embodiments, the tensioner includes a damper. This damper makes it possible to allow the peripheral cable to perform movements that are slow and/or of small amplitude, in particular while the lashing device is being installed or during operations of preparing the engine prior to ignition, while also withstanding movements that are fast and/or of large amplitude that might take place when the rocket engine is started so as to be effective in holding the diverging section when that is needed.

In certain embodiments, the peripheral cable and/or the radial cables are not made of metal. In this way, the risk of damaging the diverging section or other components of the rocket engine is reduced in the event of the lashing device striking thereagainst after being released.

In certain embodiments, the peripheral cable is configured to break in less than 5 seconds, preferably in less than 0.5 seconds, on being exposed to a temperature higher than 2500° C. In a configuration in which the peripheral cable passes through a zone that is exposed to the jet from the rocket engine or from an optional additional thruster, this makes it possible to break the peripheral cable and thus to release the lashing device.

In certain embodiments, the material of the peripheral cable possesses a melting temperature lower than 1000° C.

In certain embodiments, the peripheral cable and/or the radial cable are made of KEVLAR™.

In certain embodiments, the peripheral cable includes a breakable segment suitable for being broken on command. This makes it possible to release the lashing device on command at the desired moment. The breakable segment may for example comprise a controlled pyrotechnic charge.

The present disclosure also provides an assembly comprising a rocket engine in accordance with any of the above-described embodiments and a launch platform, the rocket engine being positioned on the launch platform, in which the launch platform includes attachment points around which the peripheral cable passes.

In the present disclosure, the term "launch platform" is used to designate any surface on which a rocket engine can be ignited, whether the engine is civilian or military, whether ignition is for a real launch or is for experimental purposes: in particular the platform may thus constitute a launch pad, a launch ramp, or indeed a test bench.

In certain embodiments, the attachment points are cylindrical. The peripheral cable is thus held by the attachment points in a horizontal plane, but it is not held in the vertical direction: the peripheral cable can thus slide off the attachment points when the diverging section begins to move upwards, thereby enabling the lashing device to be released. These attachment points are thus preferably smooth, being devoid of hooks or other protuberances.

In certain embodiments, the contour formed by the attachment points surrounds the rocket engine.

In certain embodiments, the attachment points are arranged in a circle. This serves to distribute forces well among the various attachment points.

In certain embodiments, the center of gravity of the attachment points lies on the main axis of the diverging section of the rocket engine.

In certain embodiments, the attachment points are situated so as to present an invariance in rotation about the main axis of the diverging section.

In certain embodiments, the attachment points are situated in axisymmetric manner relative to the main axis of the diverging section.

In certain embodiments, the attachment points are spaced apart in regular manner around that axis of the diverging section.

In certain embodiments, an attachment point is provided between each radial cable. These various options enable forces to be well distributed and well balanced on the various attachment points, thereby enabling the diverging section to be held correctly regardless of the zone in which a jet separation might appear.

In certain embodiments, the peripheral cable is fastened to the launch platform using a fastener device that is detachable on command. Such a fastener device serves to release the lashing device on command. It may in particular be constituted by a hook that is releasable on command.

In certain embodiments, the assembly further comprises at least one additional thruster configured to start after the rocket engine, the launch platform includes a zone exposed to the jet from the additional thruster, and the peripheral cable passes inside said zone that is exposed to the jet from the additional thruster. In this way, the cable is broken automatically by the jet of the additional thruster shortly after the main rocket engine has started, thereby releasing the lashing device.

In certain embodiments, the zone exposed to the jet of the additional thruster includes a pit, and the peripheral cable extends down into said pit.

In certain embodiments, the peripheral cable passes across said zone exposed to the jet from the additional thruster. This configuration makes it possible to expose a long length of the peripheral cable to the jet from the additional thruster so as to break the peripheral cable more quickly and more effectively. In addition, in this configuration, the peripheral cable can remain in a single horizontal plane, thereby avoiding any need to install a device for deflecting it vertically. Finally, there is no need to provide any attachment point or other member for co-operating with the cable in the zone that is exposed to the jet from the additional thruster, thereby reducing maintenance of the launch platform.

The above-specified characteristics and advantages, and others, appear on reading the following detailed description of embodiments of the proposed rocket engine. This detailed description refers to the accompanying drawings.

BRIEF DESCRIPTION OF THE DRAWINGS

The accompanying drawings are diagrammatic and seek above all to illustrate the principles of the invention.

DETAILED DESCRIPTION OF EMBODIMENT(S)

In order to make the invention more concrete, an example rocket engine is described below in detail with reference to the accompanying figures. It should be recalled that the invention is not limited to this example.

Figure 2:
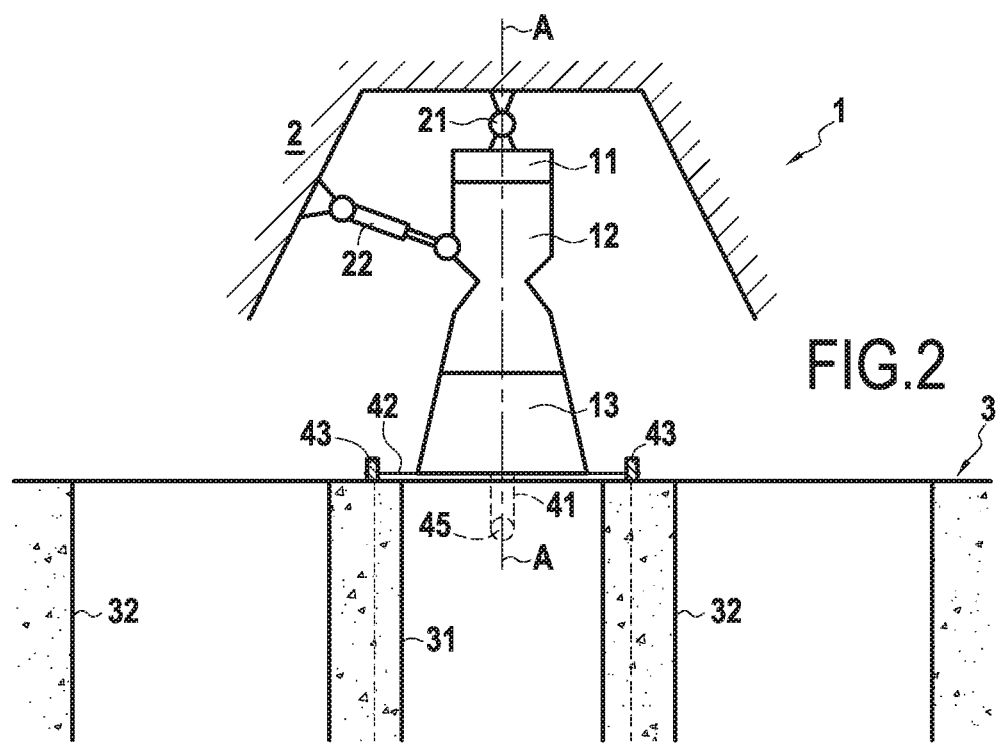
FIG. 2 is a longitudinal section view of the FIG. 1 rocket engine and launch platform.

FIG. 2 is a section view on a vertical plane containing the main axis A of a rocket engine 1 of the invention. From upstream to downstream, it comprises an injector head 11, a propulsion chamber 12, and a diverging section 13. This assembly is connected to a launcher 2 via a Cardan type universal joint 21 located at its top end, and by lateral actuators 22.

During normal operation of the engine 1, under steady conditions, the injector head 11 injects a mixture of two liquid propellants into the upstream portion of the propulsion chamber 12; combustion of the propellant then takes place in this portion of the propulsion chamber 12, forming the combustion chamber, and generates a large quantity of burnt gas that is ejected downstream at high speed; the passage of the burnt gas through the throat of the propulsion chamber 12 serves to accelerate it, while in the downstream portion of the engine and in the diverging section 13 the burnt gas expands prior to being ejected from the downstream end of the diverging section 13, thereby providing upwardly-directed opposite thrust serving to propel the launcher.

In addition to the main rocket engine 1 using liquid propellants, the launcher 2 may have a plurality of additional thrusters, e.g. solid fuel thrusters, that are also referred to as "boosters". Thus, in the present disclosure, the launcher 2 has two additional thrusters 23 arranged on either side of the main rocket engine 1.

Figure 1:
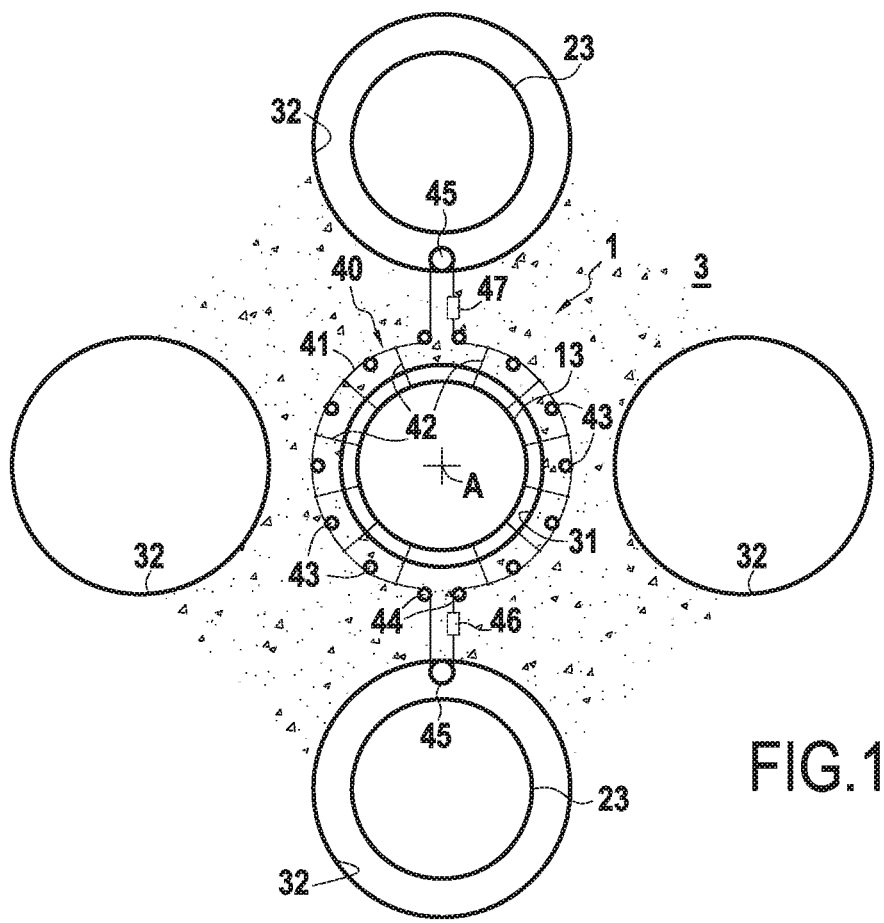
FIG. 1 is a plan view of an example rocket engine on a launch platform.

As shown in FIG. 1, while preparing for launch, the launcher 2 is placed on the launch platform 3 of a launch pad, the launch platform 3 having pits 31, 32 situated facing the rocket engine 1 and the additional thrusters 23 so as to receive the burnt gas jet from each of the engines.

The rocket engine 1 also has a lashing device 40 comprising a peripheral cable 41 and a plurality of radial cables 42 made of KEVLAR™. The first end of each radial cable 42 is attached to the bottom end of the diverging section 13 of the rocket engine 1, e.g. on the outlet nozzles of the system for cooling the diverging section 13. The other end of each radial cable 42 has a loop through which the peripheral cable 41 passes. The radial cables 42 thus extend radially relative to the main axis A of the rocket engine 1.

The peripheral cable 41, which forms a closed loop, thus goes around the diverging section 13 passing through the loops of each of the radial cables 42 and also passing behind tabs 43 forming attachment points (i.e. passing on their outsides relative to the main axis A), which tabs are provided on the launch platform 3 on a circle surrounding the diverging section 13. The peripheral cable 41 also passes in front of deflector tabs 44 (i.e. passing on their insides relative to the main axis A) in order to be directed radially towards a pit 32 in the launch platform, in which it follows an about turn behind a cleat 45. Thus, in the present example, the peripheral cable 41 descends into each of the two pits 32 situated facing the additional thrusters 23.

In the present example, each of the attachment tabs 43, of the deflector tabs 44, and of the cleats 45 is in the form of a smooth cylindrical rod.

The peripheral cable 41 also has a tensioner 46 combining a spring and a damper that serves to adjust the tension of the peripheral cable 41 once it has been installed around the various tabs and cleats 43, 44, and 45.

The operation of the lashing device is described below with reference to FIGS. 3 and 4.

Figure 3:
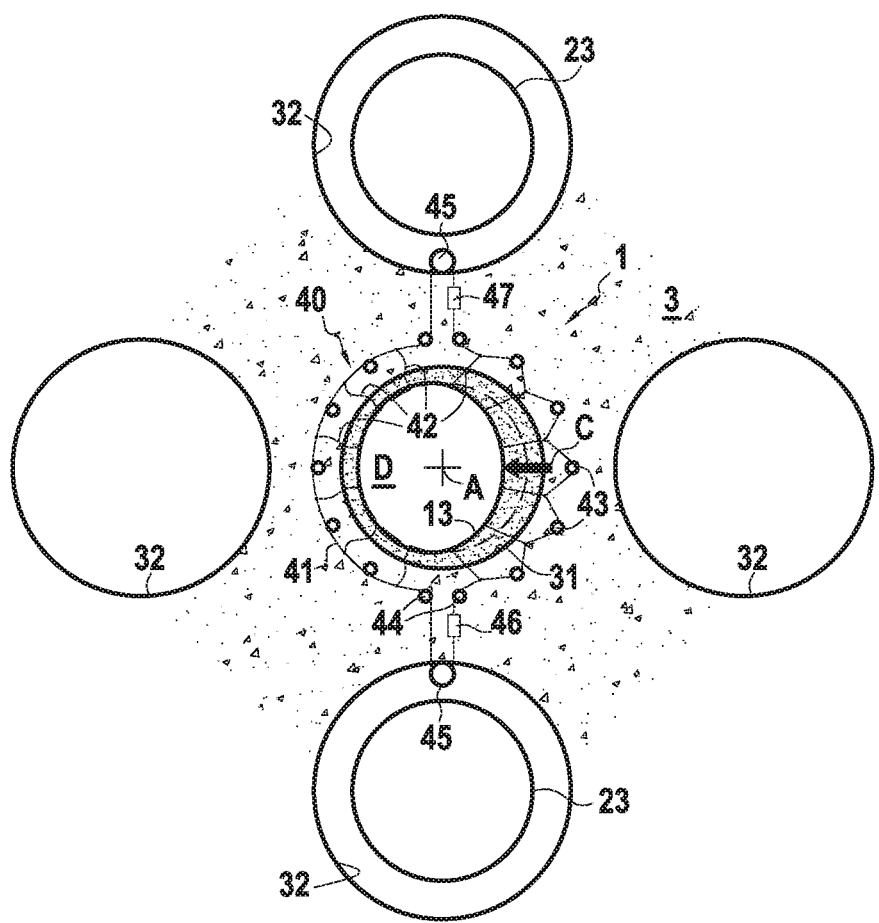
FIG. 3 is a plan view of the FIG. 1 rocket engine and launch platform while starting the rocket engine.
Figure 4:
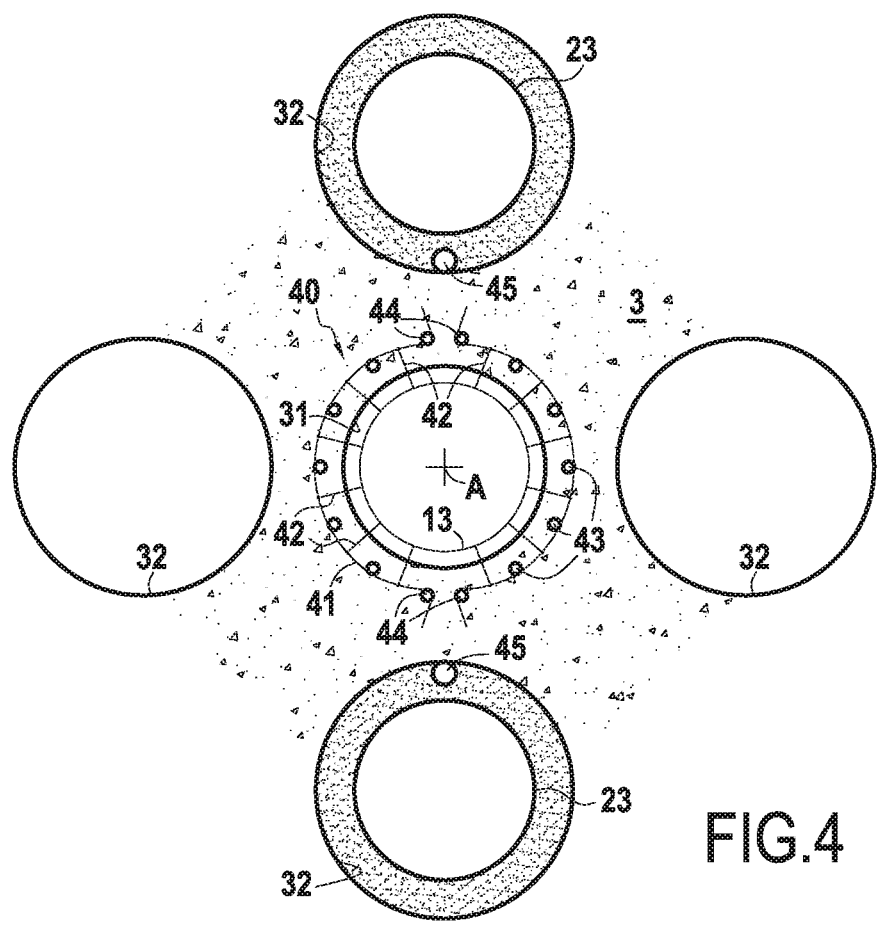
FIG. 4 is a plan view of the FIG. 1 rocket engine and launch platform during liftoff of the rocket engine.

FIG. 3 shows the situation while starting the rocket engine 1. During this starting stage, the rocket engine 1 begins combustion of the propellant and begins to eject a jet of burnt gas towards the pit 31. Nevertheless, and as shown in FIG. 3, the jet may become separated in a zone D of the diverging section 13, thereby leading to a lateral load C appearing in the wall opposite to the zone D, which load is directed inwards: the diverging section 13 thus tends to deform as shown in exaggerated manner in FIG. 3 (with the initial shape of the diverging section 13 being represented by a dashed line in this figure).

Under such circumstances, the portion of the wall of the diverging section 13 that is opposite from the separation zone D pulls on the radial cables 42, which slide and pull on the peripheral cable 41: since the peripheral cable is held by the attachment tabs 43, the lashing device 40 thus opposes any deformation or movement of the diverging section 13, thereby assisting it in maintaining its shape and its position.

After a few seconds, once all of the operating parameters of the main engine have stabilized and comply with expected values, the additional thrusters 23 are ignited and begin to eject their burnt gas into the pits 32. Under such circumstances, the high temperature of these jets cuts through the peripheral cable 41, thereby releasing it from the cleats 45.

Consequently, when the launcher 2 begins to move upwards, the peripheral cable 41 is detached from the launch platform 3 and can thus follow the launcher 2 upwards while sliding along the tabs 43 and 44 and then passing above them. The peripheral cable 41 and the radial cables 42 are then sucked into the jet of gas by the Bernoulli effect, where they are destroyed by the heat of the gas.

Alternatively, or in addition, the peripheral cable 41 may include a breakable segment, e.g. fitted with a controlled pyrotechnic charge 47, which segment is interrupted on command when the launcher 2 begins to move upwards.

Alternatively, or in addition, at least one tab 43, 44, or cleat 45 may be fitted with a release or retraction device enabling the peripheral cable 41 to be released on command when the launcher 2 begins to move upwards.

Figure 5:
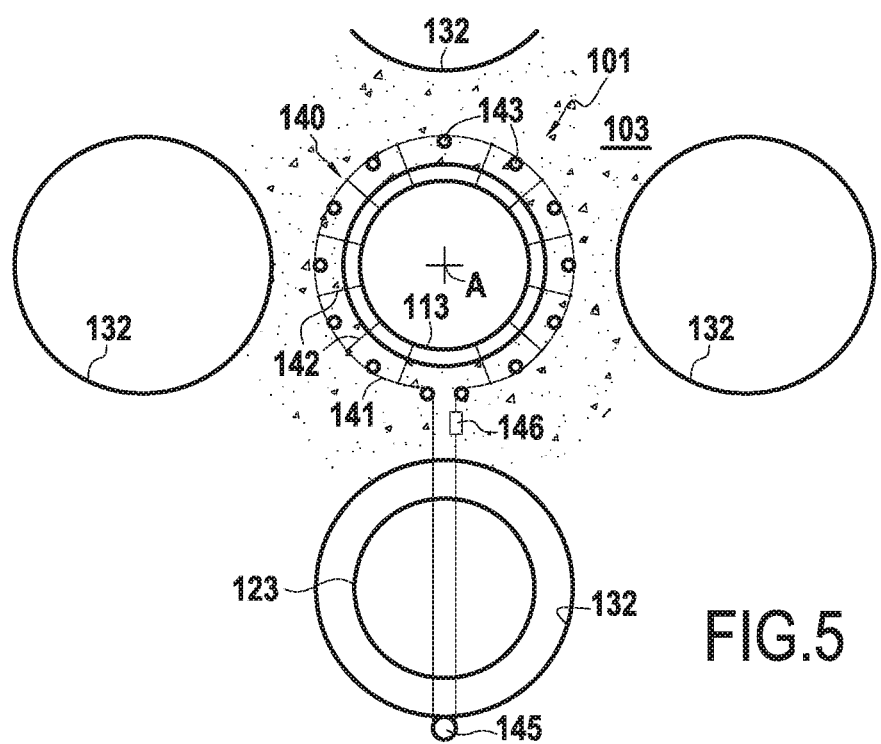
FIG. 5 is a plan view of a second example rocket engine and launch platform.

FIG. 5 shows a second rocket engine example 101 likewise having a lashing device 140 for holding the diverging section 113 with a plurality radial cables 142 when starting. The peripheral cable 141 also has a tensioner 146 combining a spring and a damper that serves to adjust the tension of the peripheral cable 141 once it has been installed around the attachment tabs 143.

The lashing device 140 is for the most part analogous to that of the above example and is therefore not described again in detail. Nevertheless, in this second example, it should be observed that the peripheral cable 141 does not go down into the pit 132 situated facing the additional thruster 123, but crosses said pit 132 diametrically from one edge to the other: as a result, the cleat 145 about which the peripheral cable 141 follows an about turn is not situated in the pit 132, but rather on the launch platform 103, beyond said pit 132 going away from the main axis A.

Furthermore, unlike the first example, in this example the peripheral cable 141 penetrates into only one zone that is exposed to the jet from an additional thruster 123, which suffices to release the lashing device 140 at the time of liftoff.

The embodiments or examples described in the present disclosure are given by way of non-limiting illustration, and in the light of this disclosure a person skilled in the art can easily modify these embodiments or examples, or envisage others, while remaining within the scope of the invention.

Furthermore, the various characteristics of these embodiments or examples may be used singly or in combination. When they are combined, these characteristics may be combined as described above or in other ways, the invention not being limited to the specific combinations described in the present disclosure. In particular, and unless specified to the contrary, a characteristic that is described with reference to one particular embodiment or example may be applied in analogous manner to another embodiment or example.

The invention claimed is:

1. A rocket engine including a diverging section and a lashing system configured to hold the diverging section while starting the rocket engine, the lashing system comprising:
    a plurality of radial cables, each radial cable of the plurality of radial cables connected at a first end to one of a plurality of points on the diverging section; and
    a peripheral cable connected to a second end of each one of the plurality of radial cables, the peripheral cable configured to co-operate with a plurality of attachment points of a launch platform.

2. The rocket engine according to claim 1, wherein the plurality of points where the plurality of radial cables are connected to the diverging section are situated in such a manner that the center of gravity of the plurality of points lies on a main axis of the diverging section.

3. The rocket engine according to claim 1, wherein the plurality of points are spaced apart in regular manner around a main axis of the diverging section.

4. The rocket engine according to claim 1, wherein the second end of at least one radial cable of the plurality of radial cables is slidable relative to the peripheral cable.

5. The rocket engine according to claim 1, wherein the peripheral cable includes a tensioner.

6. The rocket engine according to claim 5, wherein the tensioner includes a damper.

7. The rocket engine according to claim 1, wherein the peripheral cable is configured to break in less than 5 seconds on being exposed to a temperature higher than 2500° C. (4532° F.).

8. The rocket engine according to claim 1, wherein the peripheral cable includes a breakable segment suitable for being broken on command.

9. An assembly comprising a rocket engine according to claim 1 the rocket engine being positioned on the launch platform, wherein the launch platform includes the plurality of attachment points around which the peripheral cable passes.

10. The assembly according to claim 9, wherein each one of the plurality of attachment points are cylindrical.

11. The assembly according to claim 9, wherein the plurality of attachment points are arranged in a circle around the rocket engine.

12. The assembly according to claim 9, wherein the peripheral cable is fastened to the launch platform using a releasable hook that is detachable on command.

13. The assembly according to claim 9, further comprising at least one additional thruster configured to start after the rocket engine has started,
    wherein the launch platform includes a zone exposed to the jet from the additional thruster, and
    wherein the peripheral cable passes inside said zone that is exposed to the jet from the additional thruster.

* * * * *